United States Patent Office 2,826,554
Patented Mar. 11, 1958

2,826,554

PROCESS FOR RESOLVING WATER-IN-OIL TYPE EMULSIONS

Anthony J. Martinelli, Easton, Pa., assignor to General Aniline & Film Corporation, New York, N. Y., a corporation of Delaware No Drawing. Application June 23, 1955
Serial No. 517,640

14 Claims. (Cl. 252—331)

This invention relates to processes or procedures for resolving emulsions of the water-in-oil type.

There are various liquid systems existing in industry which are in the form of water-in-oil type emulsions, which emulsions must be separated into their component parts of water and oil. Prime examples of such liquid systems are the petroleum emulsions commonly referred to as "cut oil," "roily oil," "emulsified oil," etc., which are obtained from producing wells, pipelines from the bottoms of oil storage tanks, and the like, and which comprise fine droplets of naturally occurring waters or brines, dispersed in a more or less permanent state throughout the oil; the latter constituting the continuous phase of the emulsion. Water-in-oil type emulsions are also formed under controlled conditions in processes for removing impurities, particularly inorganic salts, from pipeline oil. Other water-in-oil type emulsions encountered in nature or industry include gas-tar emulsions, tar-sand-oil emulsions, emulsions encountered in the manufacture of antibiotic agents, emulsions encountered in the sweetening of caustic washing of hydrocarbons, and the like.

It is an object of this invention to provide novel process and processes for resolving, breaking, or separating water-in-oil emulsions into their oily and aqueous component parts.

It is a further object of this invention to provide novel process and processes for resolving water-in-oil emulsions employing polymers of alkyl vinyl ether.

It is a still further object of this invention to provide novel process and processes for the resolving of water-in-oil emulsions by the addition thereto of polymers of methyl and ethyl ethers.

Other objects and advantages will appear as the description proceeds.

The above recited objects are achieved by the present invention which comprises treating or subjecting water-in-oil type emulsions of the type described above to the action of polymers of alkyl vinyl ethers and, in particular, polymers of methyl and ethyl vinyl ethers, which are characterized by the formula:

wherein R is an alkyl group, preferably methyl or ethyl, and n has the value of at least 5. These polymeric alkyl vinyl ethers are well known substances and are readily available directly for use in the process and processes of this invention. The polymers which are operative in the instant invention have molecular weights ranging from about 300 up to several million or more. Viscosity measurements are commonly used as an indication of the average molecular weight of polymeric compositions. The K value Fikentscher of any particular mixture of polymers is calculated from viscosity data and is useful as an indication of the average molecular weight of such mixture. The determination of the K value is fully described in "Modern Plastics," vol. 23, No. 3, pp. 157–61, 212, 214, 216 and 218 (1945), and is defined as 1000 times $k$ in the empirical relative viscosity equation:

$$\frac{\log_{10} \mu \text{ rel.}}{C} = \frac{75k^2}{1+1.5kC} + k$$

wherein C is the concentration in grams per 100 cc. polymer solution and $\mu$ rel. is the ratio of viscosity of solution to that of pure solvent. The K values are reported as 1000 times the calculated viscosity coefficient in order to avoid the use of decimals. For the purpose of the present invention, there may be employed those polymeric vinyl ethers having a K value of about 10 to 200, and preferably from about 15 to 100.

K values and specific viscosities ($\mu$ sp.) are interconvertible and are related through relative viscosity ($\mu$ rel.). Thus, when viscosity measurements are taken on solutions which have a concentration of 1.00 g. polymer per deciliter of solution at 25° C. ($C=1$), the relations are as follows:

(1) $\mu$ rel.$=\mu$ sp.$+1$
(2) Relative viscosity$=$specific viscosity$+1$
(3) Relative viscosity$=10$ $[0.001K+$
$\qquad 0.000075K^2/(1+0.0015K)]$
(4) $\mu$ sp.$=-1+10$ $[0.001K+$
$\qquad 0.000075K^2/(1+0.0015K)]$ Relative viscosity, specific viscosity, and K are dimensionless, whereas inherent viscosity ($\log_e \mu$ rel.$\div C$) and intrinsic viscosity (the limit of inherent viscosity as C approaches 0) have the dimensions of dilution, that is, the reciprocal of concentration. Intrinsic viscosity and K are intended to be independent of concentration.

The present invention may be put into practice for demulsification by introducing a relatively small proportion of a substance of the type described above, namely, polymers of alkyl vinyl ethers, into a relatively large proportion of the water-in-oil emulsion, admixing said substance and said emulsion with agitation in any of the various types of apparatus now generally used to resolve or break petroleum emulsions, or the like, with a chemical reagent. It may be desirable and indeed preferable to apply heat to the admixture, after which said mixture is allowed to stand quiescent until the undesirable water content of the emulsion separates and settles from the oily mass. Slight agitation in the water layer at this point is usually helpful in breaking a "webbing" that sometimes forms during such demulsification process. The demulsifying agent or substance may be added directly to the emulsion or it may be first dissolved in and/or diluted with any suitable liquid medium to produce a concentrate, or the like, thereof. As suitable solvents and diluents, there may be included water, petroleum hydrocarbons, benzene, toluene, xylene, aliphatic alcohols, such as methyl alcohol, ethyl alcohol, denatured alcohol, propyl alcohol, isopropyl alcohol, butyl alcohol, the amyl alcohols, the octyl alcohols, mixtures thereof, and the like.

The demulsifying agent or substance may be employed as the sole demulsifier or it may be used in admixture with other suitable well known types of demulsifying agents. In view of the minute amounts of demulsifying agent employed, its solubility in the oil or water of the emulsion to be treated is of little significance. Thus, concentrations of the demulsifying agents of the order of from about 10 to about 500 parts by weight of demulsifier per million (p. p. m.) parts by volume of the emulsion are usually sufficient and adequate, although concentrations outside this range may, in some cases, be effective and economically feasible.

The following examples will serve to illustrate the present invention without being limitative thereof.

EXAMPLE 1

One ml. of 1% solution of polyvinyl methyl ether in a solvent combination of 65 parts xylene and 35 parts isopropyl alcohol is added to 100 mls. of crude oil emulsion contained in a 4 oz. bottle. The sample of polyvinyl methyl ether employed herein is characterized by having a relative viscosity of 1.77 and a specific viscosity of 0.77 which corresponds to a Fikentscher K value of 54.

The 4 oz. bottle containing the above described admixture is capped and mechanically shaken for 30 minutes. After removal from the mechanical shaker, the bottle is allowed to stand quiescent for 15 minutes. The color of the sample and any water separation is noted. The bottle is then immersed in a water bath maintained at 140° F. (60° C.) for 10 minutes and any water separation is noted. The bottle is then returned to the mechanical shaker for another 10 minutes, removed, and permitted to stand quiescent for 15 minutes. The resultant color and water drop are again noted. The bottle is then slightly agitated by swirling the contents thereof to break a "webbing" that forms on the water layer.

The results of this demulsifying agent are set forth in Table 1 wherein the heights of the water and oil layers are given in centimeters and the concentration of demulsifying agent is given in parts per million (p. p. m.).

EXAMPLE 2

One ml. of 1% isopropyl alcohol solution of polyvinyl methyl ether, similar to the polymer employed in Example 1, is added to 100 mls. crude oil emulsion. The same procedure for determining the effectiveness of the demulsifying agent is carried out as outlined in Example 1. The results are set forth in Table 2.

EXAMPLE 3

The same materials and procedure outlined above in Example 1 is repeated except that a 1% water solution of the polyvinyl methyl ether is employed. The effectiveness of this composition is demonstrated in Table 2.

EXAMPLE 4

The procedure of Example 1 is repeated except that 0.15 ml. of the same demulsifying composition is employed per 100 mls. crude oil emulsion.

Table 1
DEMULSIFICATION OF CRUDE OIL EMULSIONS

| Demulsifier | Concentration, p. p. m. | Shaking 30 min. (color) | Standing 15 min. | Heated 140° F., 10 min. | Shaking 10 min., standing 15 min. | Swirled |
|---|---|---|---|---|---|---|
| Ex. 1: Polyvinyl methyl ether. | 100 | Dark green | Oil 4.2—dark green. Water 2.8—Slightly webby. | Oil 3.9—Dark green. Water 3.1—clear. | Oil 3.9—Dark green. Water 3.1—Slightly webby. | Oil—Dark green. Water—Clear. |

Table 2
DEMULSIFICATION OF CRUDE OIL EMULSIONS

| Demulsifier | Concentration, p. p. m. | Shaking 30 min. (color) | Standing 15 min. | Heated 140° F., 10 min. | Shaking 10 min., standing 15 min. | Swirled |
|---|---|---|---|---|---|---|
| Ex. 2: Polyvinyl methyl ether. | 100 | Dark green | Oil 4.0—Dark green. Water 3.0—Slightly webby. | Oil 3.9—Dark green. Water 3.1—Clear. | Oil 3.9—Dark green. Water 3.1—Very slightly webby. | Oil—Dark green. Water—Clear. |
| Ex. 3: Polyvinyl methyl ether. | 100 | do | Oil 3.9—Dark green. Water 3.1—Very slightly webby. | Oil 4.0—Dark Green. Water 3.0—Mostly clear. | Oil 3.9—Dark green. Water 3.1—Very slightly webby. | Oil—Dark green. Water—Clear. |
| Ex. 4: Polyvinyl methyl ether. | 15 | Cocoa | Oil 4.7—Cocoa. Water 2.3—Very webby. | Oil 4.4—Dark green. Water 2.6—Webby. | Oil 4.0—Dark green. Water 3.0—Webby. | Oil—Dark green. Water—Clear. |
| Ex. 5: Polyvinyl methyl ether. | 15 | Light cocoa | Oil 5.2—Light cocoa. Water 1.8—Slightly webby. | Oil 4.6—Cocoa. Water 2.4—Slightly webby. | Oil 4.0—Dark green. Water 3.0—Slightly webby. | Oil—Dark green. Water—Clear. |
| Ex. 6: Polyvinyl methyl ether. | 15 | Dark green | Oil 4.0—Dark green. Water 3.0—Very webby. | Oil 4.0—Dark green. Water 3.0—Mostly clear. | Oil 4.0—Dark green. Water 3.0—Very slightly webby. | Oil—Dark green. Water—Clear. |

EXAMPLE 5

The procedure of Example 2 is repeated except that 0.15 ml. of the 1% isopropyl alcohol solution is employed.

EXAMPLE 6

The procedure of Example 3 is repeated except that 0.15 ml. of the 1% water solution of the polymer is employed. The results of Examples 4–6 are set forth in Table 2.

EXAMPLE 7

To 100 mls. of a refinery emulsion, the composition of which is approximately 70 parts water, 20 parts oil, and 10 parts solids, contained in a 6 oz. bottle, there is added 3 mls. of a 1% solution of polyvinyl methyl ether dissolved in water. The polyvinyl methyl ether employed herein is similar to the one in Examples 1–6. The results are set forth in Table 3.

EXAMPLE 8

To 100 mls. of a crude oil emulsion contained in a 4 oz. bottle, there is added 5 mls. of a 1% solution of polyvinyl ethyl ether dissolved in alcohol. The same procedure for determining the effectiveness of this composition is carried out as described in Example 1.

EXAMPLE 9

To 100 mls. of a crude oil emulsion contained in a 4 oz. bottle, there is added 10 mls. of a 1% solution of a polyvinyl ethyl ether in alcohol. The same procedure as outlined in Example 1 is carried out to determine the effectiveness of the demulsifying composition. The effectiveness of the compositions of Examples 8 and 9 are shown in Table 4.

Table 3
DEMULSIFICATION OF REFINERY EMULSIONS

| Demulsifier | Concentration, p. p. m. | Shaking 30 min., standing 30 min. | Heating 125° F. 10 min. and set 10 min. | Shake 10 min., set 15 min. | Set 2 hours |
|---|---|---|---|---|---|
| Ex. 7: Polyvinyl methyl ether | 300 | Oil 3.4 cm. Water 3.1 cm. | Oil 3.1 cm. Water 3.4 cm. | Oil 3.3 cm. Water 3.2 cm. | Oil 2.9 cm. Water 3.6 cm. (water layer clear). |

Table 4
DEMULSIFICATION OF CRUDE OIL EMULSIONS

| Demulsifier | Concentration, p. p. m. | Shaking 30 min., standing 1 hr. | Heated 140° F. 10 min., shaking 10 min., standing 15 min. | Swirled |
|---|---|---|---|---|
| Ex. 8: Polyvinyl ethyl ether. | 50 | Oil 4.3 cm. Water 2.7 cm. | Oil 4.0 cm. Water 3.0 cm. | Water layer clear. |
| Ex. 9: Polyvinyl ethyl ether. | 100 | Oil 4.3 cm. Water 2.7 cm. | Oil 3.9 cm. Water 3.1 cm. | Water layer clear. |

This invention has been disclosed with respect to certain preferred embodiments. Various modifications and variations of these embodiments will become apparent to those skilled in the art, and it is to be understood that such modifications and variations are to be included within the spirit and purview of this application and the scope of the appended claims.

I claim:
1. A process for breaking water-in-oil type emulsions comprising subjecting such emulsions to the action of a polyvinyl lower alkyl ether having a K value of from about 10 to 200.
2. A process for breaking a water-in-oil type emulsion comprising subjecting such emulsion to the action of a polyvinyl alkyl ether having a K value of from about 10 to 200 selected from the group consisting of polyvinyl methyl ethers and polyvinyl ethyl ethers.
3. A process as defined in claim 2 wherein said polymeric alkyl ether is polyvinyl methyl ether.
4. A process as defined in claim 2 wherein said polymeric alkyl ether is polyvinyl ethyl ether.
5. A process as defined in claim 3 wherein said polyvinyl methyl ether has a K value of about 54.
6. A process as defined in claim 3 wherein said emulsion is a petroleum water-in-oil emulsion.
7. A process as defined in claim 6 wherein said emulsion is a crude oil emulsion.
8. A process as defined in claim 6 wherein said emulsion is a refinery type emulsion.
9. A process as defined in claim 7 wherein the said polyvinyl methyl ether is employed in amounts of about 15 to 100 parts by weight per million parts by volume of said emulsion.
10. A process as defined in claim 8 wherein said polyvinyl methyl ether is employed in amounts up to about 500 parts by weight per million parts by volume of said emulsion.
11. A process as defined in claim 4 wherein said emulsion is a crude oil emulsion.
12. A process as defined in claim 11 wherein said polyvinyl ethyl ether is employed in amounts of about 50 to 100 parts by weight per million parts by volume of said emulsion.
13. A process as defined in claim 1 wherein the polyvinyl lower alkyl ether is employed in amounts of about 10 to about 500 parts by weight per million parts by volume of the said emulsions.
14. A process as defined in claim 1 wherein the polyvinyl lower alkyl ether is employed in amounts of about 15 to about 100 parts by weight per million parts by volume of the said emulsions.

References Cited in the file of this patent

UNITED STATES PATENTS

| 2,159,313 | Blair et al. | May 23, 1939 |
| 2,521,950 | Schildknecht | Sept. 12, 1950 |
| 2,537,706 | Rudoff | Jan. 9, 1951 |

OTHER REFERENCES

Whitby et al.: Synthetic Rubber, pub. 1954 by John Wiley and Sons of New York, pages 957 and 958.